(12) United States Patent
Slark

(10) Patent No.: US 7,829,615 B2
(45) Date of Patent: Nov. 9, 2010

(54) REACTIVE HOT MELT ADHESIVES

(75) Inventor: Andrew Trevithick Slark, Wokingham (GB)

(73) Assignee: Henkel AG & Co. KGaA, Duesseldorf (DE)

( * ) Notice: Subject to any disclaimer, the term of this patent is extended or adjusted under 35 U.S.C. 154(b) by 259 days.

(21) Appl. No.: 10/457,260

(22) Filed: Jun. 9, 2003

(65) Prior Publication Data

US 2004/0249076 A1 Dec. 9, 2004

(51) Int. Cl.
- C09J 7/02 (2006.01)
- C09D 11/10 (2006.01)
- C08F 8/30 (2006.01)
- C08L 75/00 (2006.01)

(52) U.S. Cl. ................ 524/271; 524/272; 525/125; 525/127; 525/131

(58) Field of Classification Search ............. 524/271, 524/272; 525/125, 127, 131
See application file for complete search history.

(56) References Cited

U.S. PATENT DOCUMENTS

| | | | | |
|---|---|---|---|---|
| 4,018,851 A * | 4/1977 | Baccei | ................ | 525/528 |
| 5,021,507 A | 6/1991 | Stanley et al. | | |
| 5,827,926 A | 10/1998 | Shimizu | | |
| 5,852,119 A * | 12/1998 | Kojima et al. | ........... | 525/123 |
| 6,482,878 B1 * | 11/2002 | Chu | ................ | 524/271 |
| 6,613,836 B2 * | 9/2003 | Rumack | ............ | 524/589 |
| 6,783,850 B2 * | 8/2004 | Takizawa et al. | ...... | 428/355 AC |
| 2004/0229048 A1 * | 11/2004 | Kesselmayer | ......... | 428/423.1 |
| 2005/0033004 A1 * | 2/2005 | Hoffmann et al. | ........ | 528/44 |

FOREIGN PATENT DOCUMENTS

| | | | |
|---|---|---|---|
| EP | 1 378 531 A1 | | 1/2004 |
| JP | 2003-041205 | * | 2/2003 |
| WO | WO 0146328 A1 | * | 6/2001 |
| WO | WO 03/031490 A1 | | 4/2003 |

* cited by examiner

*Primary Examiner*—William K Cheung
(74) *Attorney, Agent, or Firm*—James E. Piotrowski; Steven C. Bauman

(57) ABSTRACT

Reactive hot melt adhesives with long open time and/or high green strength prepared by using an acrylic polymer component containing a high molecular weight acrylic polymer.

16 Claims, No Drawings

REACTIVE HOT MELT ADHESIVES

FIELD OF THE INVENTION

The invention relates to hot melt adhesives, in particular reactive hot melt adhesives having both long open time and/or improved green strength with a suitable application viscosity.

BACKGROUND OF THE INVENTION

Hot melt adhesives are solid at room temperature but, upon application of heat, melt to a liquid or fluid state in which form they are applied to a substrate. On cooling, the adhesive regains its solid form. The hard phase(s) formed upon cooling the adhesive imparts all of the cohesion (strength, toughness, creep and heat resistance) to the final adhesive. Curable hot melt adhesives, which are also applied in molten form, cool to solidify and subsequently cure by a chemical crosslinking reaction. An advantage of hot melt curable adhesives over traditional liquid curing adhesives is their ability to provide "green strength" upon cooling prior to cure.

The majority of reactive hot melts are moisture-curing urethane adhesives. These adhesives consist primarily of isocyanate terminated polyurethane prepolymers that react with surface or ambient moisture in order to chain-extend, forming a new polyurethane polymer. Polyurethane prepolymers are conventionally obtained by reacting diols with diisocyanates. Pure diols are favored for use, instead of polyols with higher functionality, to avoid excessive branching that can lead to poor pot stability. Methylene bisphenyl diisocyanate (MDI) is favored over lower molecular weight isocyanates to minimize volatility. Cure is obtained through the diffusion of moisture from the atmosphere or the substrates into the adhesive, and subsequent reaction. The reaction of moisture with residual isocyanate forms carbamic acid. This acid is unstable, decomposing into an amine and carbon dioxide. The amine reacts rapidly with isocyanate to form a urea. The final adhesive product is a crosslinked material held together primarily through urea groups and urethane groups.

The prior art discloses that the performance of reactive hot melt adhesives for most applications may be substantially improved by the incorporation of low molecular weight acrylic polymers and/or incorporating crystalline diols, e.g. polyesters. Prior art adhesives are tough, with good low temperature flexibility, heat and chemical resistance, and specific adhesion to polar substrates. Adhesion to a wide range of other substrates may be obtained through the addition of adhesion promoters such as silane coupling agents. However, it is difficult to achieve long open time and/or high green strength at a reasonable application viscosity. High green strength can be achieved by using crystalline materials (e.g polyester diols), however this substantially limits the open time achievable. Alternatively, this can be achieved by the use of polyurethanes with high molecular weight, however the resulting application viscosity is high and the open time is limited. EP246473B discloses the use of low molecular weight acrylic polymers to increase cohesive strength. These low molecular weight polymers are typically in the range of 10,000-30,000 g/mole and contain no active hydrogen. High green strength can also be achieved by using hydroxyl functionalized acrylic polymers, as exemplified by U.S. Pat. No. 5,866,656 (Mn 4,000-15,000) and EP1036103 (Mw<60,000 g/mole) but the molecular weight or concentration should not be too high or the viscosity will be too high and/or the product will have low viscosity stability. This is likely to result from a fraction of the acrylic polymer containing greater than 2 hydroxyl functional groups per chain. This arises from the hydroxyl functionality being provided by a functional comonomer that is incorporated in a statistical fashion during a free-radical polymerisation, providing polymer chains with a distribution of functionality. Despite advances in the art, there remains a need for improvements in reactive hot melt technology to expand the application of such adhesives and their effectiveness in such applications. The present invention addresses this need.

SUMMARY OF THE INVENTION

The invention provides moisture curable reactive hot melt adhesive compositions that have long open time and/or high green strength at a reasonable application viscosity. In particular, high molecular weight acrylic polymers are used to promote chain entanglements and enhancement of green strength while simultaneously retaining a long open time, since they are used at lower concentrations than low molecular weight polymers to obtain similar application melt viscosity.

One aspect of the invention is directed to a polyurethane hot melt adhesive composition containing a high molecular weight acrylic copolymer.

A second embodiment involves a polyurethane hot melt adhesive composition consisting of combinations of high molecular weight acrylic copolymer and low molecular weight polymer that are particularly advantageous.

A third embodiment involves a polyurethane hot melt adhesive composition consisting of combinations of high molecular weight acrylic copolymer and low molecular weight acrylic component where the latter can contain hydroxyl functionality.

A fourth embodiment involves a polyurethane hot melt adhesive composition consisting of combinations of high molecular weight acrylic copolymer and non-polymeric aliphatic and/or aromatic diols.

A fifth embodiment is directed to a polyurethane hot melt adhesive composition containing a high molecular weight acrylic copolymer and a tackifying resin. The tackifying resin may or may not contain hydroxyl functionality.

In all aspects one-five above, the compositions can optionally contain at least one polyether diol and polyester diol.

A further embodiment of the invention is directed to a method of improving the open time and/or green strength of a polyurethane hot melt adhesive with a suitable application viscosity comprising a high molecular weight acrylic polymer according to embodiments one-five above.

Yet another embodiment of the invention is directed to a method for bonding materials together which comprises applying the reactive hot melt adhesive composition of the invention in a liquid form to a first substrate, bringing a second substrate in contact with the composition applied to the first substrate, and subjecting the applied composition to conditions which will allow the composition to cool and cure to an irreversible solid form, said conditions comprising moisture.

Still another aspect of the invention is directed to an article of manufacture comprising the adhesive of the invention.

DETAILED DESCRIPTION OF THE INVENTION

All percents are percent by weight of the adhesive composition, unless otherwise stated.

It has now been discovered that adhesives with long open times and/or high green strength with suitable application viscosity can be prepared by using high molecular weight acrylic polymers.

The moisture curable, hot melt polyurethane adhesives of the invention may be prepared through the reaction of a mixture of polyols with an isocyanate-containing compound at a typical temperature from about 100° C. to 130° C. The adhesives of the invention comprise an isocyanate, MDI being preferred, acrylic polymer(s), and optionally polyetherpolyol(s), optionally polyester polyol(s), optionally non-polymeric aliphatic/aromatic diols and optionally tackifiers.

The overall acrylic polymer concentration is in the range of about 1 to about 99 wt %, more preferably in the range of about 5 to about 75 wt % and more preferably in the range of about 10 to about 50 wt %.

The high molecular weight acrylic polymer has a molecular weight (Mw) in the range 60,000 to about 250,000 g/mole, more preferably 60,000-200,000 g/mole, more preferably 60,000-180,000 g/mole and more preferably 80,000-180,000 g/mole. The average molecular weight is determined by Size Exclusion Chromatography (otherwise known as Gel Permeation Chromatography) calibrated against Poly(methyl methacrylate) standards of narrow molecular weight distribution. The polymer may be linear or branched and may consist of copolymerised alkyl functional (meth)acrylic monomers, acid functional (meth)acrylic monomers, tertiary amine functional (meth)acrylic monomers and may contain other functional groups that do not react rapidly with isocyanate functional groups. Branching in the acrylic polymer can be induced by copolymerising a polyfunctional comonomer and/or using a polyfunctional chain transfer agent and/or a polyfunctional initiator.

A preferred embodiment includes a mixture of high molecular weight acrylic polymer and low molecular weight polymer. This enables maximising green strength at a relatively low application viscosity. The low molecular weight polymer can be linear or branched. Branching can be induced by copolymerising a polyfunctional comonomer and/or using a polyfunctional chain transfer agent.

The ratio of high molecular weight acrylic polymer to low molecular weight acrylic polymer is in the range of about 100/0 to about 5/95, and preferably about 100/0 to about 25/75.

The optional low molecular weight polymer is linear or branched with a weight average molecular weight (Mw) in the range of about 5,000 to about 60,000 g per mole, more preferably in the range of about 5,000 to about 40,000 g per mole and more preferably in the range of about 10,000 to about 30,000 g per mole.

The polymer may be linear or branched and may consist of, but not limited to, copolymerised alkyl functional (meth)acrylic monomers, acid functional (meth)acrylic monomers, tertiary amine functional (meth)acrylic monomers or hydroxyl functionalised (meth)acrylic comonomers. The latter option promotes further green strength by becoming covalently bonded into the polyurethane structure. Other functional comonomers include, without limitation amine, isocyanate, and thio functional monomers.

The reactive hot melt compositions of the invention are useful for bonding articles composed of a wide variety of substrates (materials), including but not limited to various types of wood, metal, polymers, glass and fabrics or textiles. As such, these adhesives find particular use in applications such as the manufacture of doors including entry doors, garage doors and the like, the manufacture of architectural panels, bonding components on the exterior of vehicles and the like, water towers, bonding to exterior surfaces, bonding to wood with high levels of pitch and marine and automotive applications. Other non-limiting uses include textile bonding applications (carpet and clothing), use in the manufacture of footwear (shoes), and use as a glazing/backbedding compound in the manufacture of windows, Virtually any ethylenically unsaturated comonomer may be utilized in the compositions of the present invention for both the high molecular weight and low molecular weight components. For functional comonomers, acid functional or tertiary amine monomers are preferred for the high molecular weight component, whereas acid, tertiary amine or hydroxyl functional groups are preferred for the low molecular weight component.

Acrylic comonomers may be formulated and polymerised so as to produce a wide range of Tg values, as between about −48° C. and 105° C., more preferably about −20° C. to 85° C. and more preferably 15° C. to 85° C. Suitable comonomers include the $C_1$ to $C_{12}$ esters of methacrylic and acrylic acids including, but not limited to methyl methacrylate, ethyl methacrylate, n-propyl, iso-propyl methacrylate, n-butyl methacrylate, isobutyl methacrylate, n-hexyl methacrylate, n-octyl methacrylate 2-ethylhexyl methacrylate, dodecyl(lauryl) methacrylate or the corresponding acrylates. Mixtures of compatible (meth)acrylate monomers may also be used. Methacrylic and acrylic comonomers based on esters of methacrylic and acrylic acid with poly(ethylene glycol) and/or poly(propylene glycol) and/or glycol ethers may also be used. Other additional vinyl comonomers that may be used include the vinyl esters (e.g. vinyl acetate and vinyl propionate); vinyl ethers; esters of crotonic acid, maleic acid, fumaric acid & itaconic acid; styrene; alkyl styrenes; acrylonitrile; butadiene; etc. as well as comonomers thereof. The particular monomers selected will depend, in large part, upon the end use for which the adhesives are intended. Thus, adhesives to be used in pressure sensitive applications or in applications wherein adhesion to metal is required will be selected to obtain a lower Tg polymer than may be desired in non-pressure sensitive applications or those involving more easily bonded substrates.

Suitable acid functional comonomers include, but are not limited to, methacrylic acid and acrylic acid.

Suitable hydroxyl functionalised comonomers that can be incorporated include, but are not limited to, 2-hydroxyethylmethacrylate, 2-hydroxyl propyl methacrylate and 2-hydroxybutyl methacrylate or the corresponding acrylates.

Suitable amine functionalised comonomers include, but are not limited to, dimethylaminoethyl methacrylate, diethylaminoethyl methacrylate or the corresponding acrylates.

The polymers may be blended with the polyol prior to reaction thereof with the isocyanate or they may be added directly to the isocyanate terminated prepolymer.

When the adhesive is to be prepared utilizing monomeric materials, the respective monomers may be added to the polyols and polymerized therein prior to formation of the prepolymer or may be added to the already formed prepolymer and the acrylic polymerization subsequently performed. In the case of polyamino or polymercapto containing prepolymers, in-situ vinylic polymerization must be performed only in the pre-formed prepolymer.

The polymers are prepared by free-radical polymerisation and molecular weight is controlled by using a chain transfer agent, e.g. a thiol such as dodecyl mercaptan or catalytic chain transfer based on transition metal complexes. Branched polymers are made by copolymerising a multifunctional monomer and/or using a multifunctional chain transfer agent and/ or using a multifunctional initiator. Subsequent to the polymerization of the ethylenically unsaturated monomer(s), the polyisocyanate and any additional ingredients required for the urethane prepolymer forming reaction are added and that reaction is carried out using conventional condensation polymerization procedures. In this manner, the resultant isocyanate terminated urethane prepolymer forms the reactive curing hot melt adhesive described above.

It is also possible to polymerize the polymers in the presence of the already formed isocyanate terminated urethane prepolymer. This method has the drawback of subjecting the prepolymer to unnecessary heating during the acrylic polymerization; heating that might result in branching, viscosity increase, depletion of needed isocyanate groups and possible gellation. Although these disadvantages are subject to control, more stringent control of conditions are required as compared to polymerization in the non-isocyanate functional urethane components. When the reaction is run in the polyol or other non-isocyanate containing component, there is also the advantage of lower reaction viscosities and reduced exposure to isocyanate vapors because of the lesser amount of heating required.

The urethane prepolymers that can be used to prepare the adhesives of the invention are those conventionally used in the production of polyurethane hot melt adhesive compositions. Any suitable compound, which contains two or more isocyanate groups, may be used for preparing the urethane prepolymers. Typically from about 2 to about 25 parts by weight of an isocyanate is used, although this is not limiting.

Organic polyisocyanates, which may be used to practice the invention, include alkylene diisocyanates, cycloalkylene diisocyanates, aromatic diisocyanates and aliphatic-aromatic diisocyanates. Specific examples of suitable isocyanate-containing compounds include, but are not limited to, ethylene diisocyanate, ethylidene diisocyanate, propylene diisocyanate, butylene diisocyanate, trimethylene diisocyanate, hexamethylene diisocyanate, toluene diisocyanate, cyclopentylene-1,3-diisocyanate, cyclo-hexylene-1,4-diisocyanate, cyclohexylene-1,2-diisocyanate, 4,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, dichlorohexa-methylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyldiphenyl-methane-2,2',5,5-tetratetraisocyanate, and the like. While such compounds are commercially available, methods for synthesizing such compounds are well known in the art. Preferred isocyanate-containing compounds are methylenebisphenyldiisocyanate (MDI), isophoronediisocyanate (IPDI), hydrogenated methylenebisphenyldiisocyanate (HMDI) and toluene diisocyanate (TDI).

Most commonly, the prepolymer is prepared by the polymerization of a polyisocyanate with a polyol, most preferably the polymerization of a diisocyanate with a diol. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol, as well as mixtures thereof. The polyol is typically used in an amount of between about 5 to about 70 parts by weight.

Examples of polyether polyols include a linear and/or branched polyether having plural numbers of ether bondings and at least two hydroxyl groups, and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct at least one compound selected from the group consisting of ethylene glycol, propylene glycol, diethylene glycol, dipropylene glycol, triethylene glycol, 2-ethylhexanediol-1,3, glycerin, 1,2,6-hexane triol, trimethylol propane, trimethylol ethane, tris(hydroxyphenyl)propane, triethanolamine, triisopropanolamine, ethylenediamine and ethanolamine; with at least one compound selected from the group consisting of ethylene oxide, propylene oxide and butylene oxide.

A number of suitable polyols are commercially available. Non-limiting examples include Voranol P400, P725, P1000, P2000, P4000 (Dow), CP4701 (Dow Chemicals), Niax 11-34 (Union Carbide Corp), Desmorphen 3900 (Bayer), Propylan M12 (Lankro Chemicals), Highflex 303 (Daiichi Kogyo Seiyaku K.K.) and Daltocel T 32-75 (ICI). "Polymer polyols" are also suitable, i.e., graft polyols containing a proportion of a vinyl monomer, polymerized in situ, e.g., Niax 34-28.

Polyester polyols are formed from the condensation of one or more polyhydric alcohols having from 2 to 15 carbon atoms with one or more polycarboxylic acids having from 2 to 14 carbon atoms. Examples of suitable polyhydric alcohols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, dodecanediol, octanediol, chloropentanediol, glycerol monallyl ether, glycerol monoethyl ether, diethylene glycol, 2-ethylhexanediol-1,4, cyclohexanediol-1,4,1,2,6-hexanetriol, 1,3,5-hexanetriol, 1,3-bis-(2-hydroxyethoxy)propane and the like. Examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, tricarballylic acid, 3,3'-thiodipropionic acid, succinic acid, adipic acid, malonic acid, glutaric acid, pimelic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing no more than 14 carbon atoms and the aromatic dicarboxylic acids containing no more than 14 atoms.

Commercially available polyols which may be used in the practice of the invention include polyethers such as Voranol P400, P725, P1000, P2000, P4000 (Bayer), PolyG 20-56 (Arch) and Pluracol P-2010 (BASF), polyesters such as Dynacol 7360, 7380, 7381 (Degussa-Huls), Fomrez 66-32 (Crompton) and Rucoflex S-105-30 (Bayer) and polybutadiene such as PolyBD R-45HTLO (Elf Atochem).

In addition, the urethane prepolymers may be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above. In accordance with one embodiment of the invention, the hydroxyl containing acrylic polymer may function as the polyol component, in which case, no additional polyol need be added to the reaction.

Further, small amounts of low molecular weight dihydroxy, diamino, or amino hydroxy compounds may be used such as saturated and unsaturated glycols, e.g., ethylene glycol or condensates thereof such as diethylene glycol, triethylene glycol, and the like; ethylene diamine, hexamethylene diamine and the like; ethanolamine, propanolamine, N-methyldiethanolamine and the like.

While the adhesives may be used directly as described above, if desired the adhesives of the present invention may also be formulated with conventional additives that are compatible with the composition. Such additives include plasticizers, compatible tackifiers, non-reactive tackifying resins, reactive tackifying resins, curing catalysts, dissociation catalysts, fillers, anti-oxidants, pigments, adhesion promoters, stabilizers, aliphatic $C_5$-$C_{10}$ terpene oligomers and the like. Conventional additives that are compatible with a composition according to this invention may simply be determined by combining a potential additive with the composition and determining if they are compatible. An additive is compatible if it is homogenous within the product. Non-limited examples of suitable additives include, without limitation, rosin, rosin derivatives, rosin ester, aliphatic hydrocarbons, aromatic hydrocarbons, aromatically modified aliphatic hydrocarbons, aliphatically modified aromatic hydrocarbons, terpenes, terpene phenol, modified terpene, high molecular weight hindered phenols and multifunctional phenols such as sulfur and phosphorous-containing phenol, terpene oligomers, dimorpholinodiethyl ether, paraffin waxes, microcrystalline waxes and hydrogenated castor oil.

The reactive hot melt adhesives of the invention may also contain flame retardant components. Fire retardant additives known in the art for imparting flame resistance to polyurethane compositions may be added. Such compounds include inorganic compounds such as a boron compound, aluminum hydroxide, antimony trioxide and the like, and other halogen compounds including halogen-containing phosphate, compounds such as tris(chloroethyl)phosphate, tris(2,3-dichloropropyl)-phosphate, and the like. These and other flame retarding compositions are described in U.S. Pat. Nos. 3,773,695 4,266,042, 4,585,806, 4,587,273 and 4,849,467, and European Patent No. 0 587 942. In a preferred embodiment, ethylenebistetrabromophthalimide and/or tris(2,3-dibromopropyl)-isocyanurate is added as a prime flame retardant component. The ethylenebistetrabromophthalimide and/or tris(2,3-dibromopropyl)isocyanurate may be used with or without other flame retardants. The composition may further comprise a chlorinated paraffin and/or an aryl phosphate ester as a further flame retardant component.

The invention also provides a method for bonding articles together which comprises applying the reactive hot melt adhesive composition of the invention in a liquid melt form to a first article, bringing a second article in contact with the composition applied to the first article, and subjecting the applied composition to conditions which will allow the composition to cool and cure to a composition having an irreversible solid form, said conditions comprising moisture. The composition is typically distributed and stored in its solid form, and is stored in the absence of moisture. When the composition is ready for use, the solid is heated and melted prior to application. Thus, this invention includes reactive polyurethane hot melt adhesive compositions in both its solid form, as it is typically to be stored and distributed, and its liquid form, after it has been melted, just prior to its application.

After application, to adhere articles together, the reactive hot melt adhesive composition is subjected to conditions that will allow it to solidify and cure to a composition that has an irreversible solid form. Solidification (setting) occurs when the liquid melt is subjected to room temperature. Curing, i.e. chain extending, to a composition that has an irreversible solid form, takes place in the presence of ambient moisture.

As used herein, "irreversible solid form" means a solid form comprising polyurethane polymers extended from the aforementioned polyurethane prepolymers. The composition having the irreversible solid form typically can withstand temperatures of up to 150° C. Using a flame retardant the thermal stability of the irreversible solid can be improved.

The invention is further illustrated by the following non-limiting examples.

EXAMPLES

In the Examples that follow, the following tests were used to determine viscosity and dynamic peel rate.

Melt Viscosity:

Measured using a Brookfield Viscometer model RVDV-1+ with a Model 74R temperature controller and Thermosel unit, using spindle no. 27. The adhesive is heated in an oven to 120° C. 14 g of adhesive is weighed into a disposable aluminium viscometer tube. The tube is inserted into the Viscometer and left to equilibrate to a constant viscosity reading at 120° C. for 20 minutes.

Dynamic Peel:

A 150 micron thick film of adhesive was applied to a glass plate, preheated at 120° C. A strip of PVC (25 mm wide, 7 mil thick) with a hole punched near one end was applied over the adhesive. The plate is inverted and a thermocouple is attached to the glass plate to record the temperature as it falls. At a suitable temperature, a 1 Newton weight was suspended from the hole in the vinyl at the time set at t=0. At 1 minute intervals, the temperature and distance moved was recorded. The peel rate at these intervals was calculated.

Open Time Method 1

The adhesive is preheated to 120° C. and a 150 micron thick film is applied to MDF. The time is set at t=0. At intervals of 30 seconds or 1 minute, a paper strip is applied using light-medium finger pressure and pulled off. The open time limit occurs when there is no paper tear resulting from a lack of adequate wetting of the paper by the adhesive.

Open Time Method 2

The same method as above, except a 2.0 Kg roller is applied across the surface of the paper in contact with the adhesive. This is to simulate a constant pressure.

Comparative Example 1

The following adhesive was used as a bench mark of the prior art, the composition of which is shown in Table 1, was used as a benchmark Table 1

TABLE 1

| Sample | Ingredient | Supplier | Weight % |
|---|---|---|---|
| 1 | Polyether polyol VORANOL P2000 | Dow | 39.8 |
| | Acrylic Polymer ELVACITE 2016 | Lucite International | 28.4 |
| | Polyester Diol DYNACOL 7360 | Degussa Huls | 19.9 |
| | MDI | Bayer | 11.7 |
| | DMDEE catalyst | Alfa | 0.2 |

The properties of the standard adhesive are shown in Table 2

TABLE 2

| Sample | Viscosity 120° C. (cP) | Open time 1 (minutes) | Open time 2 (minutes) | Dynamic Peel 32.5 C. (mm/minute) |
| --- | --- | --- | --- | --- |
| 1 | 15,000 | 10 | 10.5 | 21 |

Example 2

Adhesives were formulated using high molecular weight acrylic polymers. Various acrylic polymers were used, with all of the acrylic polymers being copolymers of methyl methacrylate, n-butyl methacrylate and methacrylic acid with a Tg of 50° C. The acrylic polymers included in Samples 2-4 have the following molecular weights:

| Acrylic 1 | Mw = 7,000 g/mole | Elvacite 2016, Lucite International |
| --- | --- | --- |
| Acrylic 2 | Mw = 114,000 g/mole | Development product, Lucite International |
| Acrylic 3 | Mw = 162,400 g/mole | Development product, Lucite International |

TABLE 3

| Sample | 2 | 3 | 4 |
| --- | --- | --- | --- |
| Acrylic 1 | 42.5 | — | — |
| Acrylic 2 | — | 30.0 | — |
| Acrylic 3 | — | — | 25.0 |
| PPG 2000 | 46.0 | 56.0 | 60.0 |
| MDI | 11.5 | 14.0 | 15.0 |

The results of testing on the samples of Table 3 are illustrated in Table 4.

TABLE 4

| Sample | Viscosity 120° C. (cP) | Open time 1 (minutes) | Open time 2 (minutes) | Dynamic Peel 32.5° C. (mm/minute) |
| --- | --- | --- | --- | --- |
| 1 | 15,000 | 10 | 10.5 | 21 |
| 2 | 26,000 | 1.5 | — | 5 |
| 3 | 21,000 | 22 | — | 6 |
| 4 | 33,000 | 13 | — | 3 |

This demonstrates that acrylic polymers with high molecular weight can produce longer open time and increased green strength.

Example 3

Samples of adhesives with both high molecular weight and low molecular weight acrylic polymers were formulated (table 5). Acrylic 4 is a branched copolymer of methyl methacrylate, n-butyl methacrylate and methacrylic acid with a Tg of 46° C. and an Mw of 18,000 g/mole, supplied by Lucite International.

TABLE 5

| Sample | 5 | 6 | 7 | 8 | 9 | 10 |
| --- | --- | --- | --- | --- | --- | --- |
| Acrylic 1 | 34.0 | 25.5 | — | — | — | — |
| Acrylic 2 | — | — | 24.0 | 18.0 | — | — |
| Acrylic 3 | — | — | — | — | 20.0 | 15.0 |
| Acrylic 4 | 8.5 | 17.0 | 6.0 | 12.0 | 5.0 | 10.0 |
| PPG 2000 | 46.0 | 46.0 | 56.0 | 56.0 | 60.0 | 60.0 |
| MDI | 11.5 | 11.5 | 14.0 | 14.0 | 15.0 | 15.0 |

The results of testing on Samples 5-10 are illustrated in Table 6.

TABLE 6

| Sample | Viscosity 120° C. (cP) | Open time 1 (minutes) | Open time 2 (minutes) | Dynamic Peel 32.5° C. (mm/minute) |
| --- | --- | --- | --- | --- |
| 1 | 15,000 | 10 | 10.5 | 21 |
| 5 | 21,600 | — | 2 | 4 |
| 6 | 13,750 | — | 8 | 7 |
| 7 | 13,000 | — | 137 | 9 |
| 8 | 7,800 | — | 205 | 20 |
| 9 | 18,400 | — | 170 | 7 |
| 10 | 10,100 | — | 190 | 12 |

As shown in Table 6, the formulations containing both high and low molecular weight acrylic polymers produce long open time and/or improved green strength.

Example 4

Samples of adhesives with high molecular weight and hydroxyl functionalised low molecular weight acrylic polymers were formulated. The acrylic polymers that were used were copolymers of methyl methacrylate, n-butyl methacrylate and 2-hydroxyethyl methacrylate with an —OH number of 9.5 and the following molecular weights:

| Acrylic 5 | Mw = 26,000 g/mole and Tg = 50° C., developmental product by Lucite International |
| --- | --- |
| Acrylic 6 | Mw = 26,900 g/mole and Tg = 74° C., developmental product by Lucite International |

TABLE 7

| Sample | 11 | 12 | 13 | 14 | 15 |
| --- | --- | --- | --- | --- | --- |
| Acrylic 2 | — | 20.0 | 12.5 | 20.0 | 12.5 |
| Acrylic 5 | 40.0 | 17.5 | 25.0 | — | — |
| Acrylic 6 | — | — | — | 17.5 | 25.0 |
| PPG 2000 | 48.0 | 50.0 | 50.0 | 50.0 | 50.0 |
| MDI | 12.0 | 12.5 | 12.5 | 12.5 | 12.5 |

The results of testing on the samples from Table 7 are illustrated in Table 8.

TABLE 8

| Sample | Viscosity 120° C. (cP) | Open time 1 (minutes) | Open time 2 (minutes) | Dynamic Peel 32.5° C. (mm/minute) |
| --- | --- | --- | --- | --- |
| 1 | 15,000 | 10 | 10.5 | 21 |
| 11 | 11,200 | 1.5 | — | 4 |
| 12 | 25,600 | 6.0 | — | 2.5 |
| 13 | 18,500 | 5.0 | — | 4.3 |

TABLE 8-continued

| Sample | Viscosity 120° C. (cP) | Open time 1 (minutes) | Open time 2 (minutes) | Dynamic Peel 32.5° C. (mm/minute) |
|---|---|---|---|---|
| 14 | 26,250 | 6.5 | — | 1.8 |
| 15 | 19,000 | 1.5 | — | 3.0 |

The formulation with hydroxyl functional acrylic only (sample 11) has good green strength (low peel) but a short open time. The combination of high molecular weight acrylic and low molecular weight hydroxyl functional acrylic increases open time but retains the high green strength.

Example 5

Adhesives with high molecular weight acrylic polymers, low molecular weight acrylic polymers and non polymeric diols. The formulations of the samples are shown in Table 9.

TABLE 9

| Sample | 16 | 17 | 18 | 19 |
|---|---|---|---|---|
| Acrylic 2 | 18.75 | 20.63 | 14.4 | 18.0 |
| Acrylic 4 | 6.25 | 6.87 | — | 6.0 |
| Acrylic 5 | — | — | 12.6 | — |
| 1,10 decane diol | 3.0 | 3.0 | 3.25 | — |
| 1,12 dodecane diol | — | — | — | 3.0 |
| PPG 2000 | 50.75 | 49.0 | 48.5 | 52.5 |
| MDI | 21.25 | 20.5 | 21.5 | 20.5 |

The results of testing on the samples of Table 9 are illustrated in Table 10.

TABLE 10

| Sample | Viscosity 120° C. (cP) | Open time 1 (minutes) | Open time 2 (minutes) | Dynamic Peel 32.5° C. (mm/minute) |
|---|---|---|---|---|
| 1 | 15,000 | 10 | 10.5 | 21 |
| 16 | 11,700 | — | 6.0 | 8 |
| 17 | 43,500 | — | 6.0 | 2 |
| 18 | 12,250 | — | 35.0 | 9 |
| 19 | 15,000 | — | — | 5 |

Table 10 demonstrates that the incorporation of short-chain diols in combination with high molecular weight and low molecular weight acrylic produces good open time and high green strength; samples 16 and 18 produce this at lower melt viscosity compared to sample 1.

Example 6

Adhesives with high molecular weight acrylic polymers, low molecular weight acrylic polymers, polyesters and tackifiers. The formulations of the samples are shown in Table 11.

TABLE 11

| material | 20 | 21 | 22 | 23 | 24 | 25 | 26 | 27 |
|---|---|---|---|---|---|---|---|---|
| VORANOL P2000 | 43.7 | 38.8 | 34.9 | 38.7 | 37.8 | 51.3 | 41.2 | 41.0 |
| Acrylic 2 | 15.0 | 13.3 | 11.9 | 13.3 | 13.3 | 24.4 | 19.2 | 19.5 |
| Acrylic 5 | 13.2 | 11.7 | 10.5 | 11.7 | 11.7 | — | — | — |
| DYNACOL 7360 | 14.0 | 12.4 | 11.2 | 8.3 | 12.4 | — | — | — |

TABLE 11-continued

| material | 20 | 21 | 22 | 23 | 24 | 25 | 26 | 27 |
|---|---|---|---|---|---|---|---|---|
| DYNACOL 7380 | 1.0 | 0.9 | 0.8 | 5.0 | 0.9 | — | — | — |
| DYNACOL 7381 | — | — | — | — | — | 10.0 | 8.0 | 8.0 |
| NOVARES TK100 | — | 11.1 | 20.0 | 11.1 | 11.1 | — | 20.0 | — |
| NOVARES TA100 | — | — | — | — | — | — | — | 20.0 |
| MDI | 13.0 | 11.6 | 10.5 | 11.6 | 11.6 | 14.3 | 11.5 | 11.4 |
| DMDEE | 0.2 | 0.2 | 0.2 | 0.2 | 0.2 | — | — | — |
| A1310 | — | — | — | — | 1.0 | — | — | — |

DYNACOL 7360, DYNACOL 7380 and DYNACOL 7381 are crystalline polyesters supplied by Degussa-Huls. NOVARES TK100 is an aliphatically modified aromatic hydrocarbon without hydroxyl functionality, supplied by Ruetgers VFT. NOVARES TA100 is an aliphatically modified aromatic hydrocarbon resin with hydroxyl functionality, supplied by Ruetgers VFT. SILQUEST A1310 is a silane adhesion promoter supplied by Ambersil.

The results of testing on the samples of Table 11 are illustrated in Table 12.

TABLE 12

| Sample | Viscosity 120° C. (cP) | Open time 1 (minutes) | Open time 2 (minutes) | Dynamic Peel 32.5° C. (mm/minute) |
|---|---|---|---|---|
| 1 | 15,000 | 10 | 10.5 | 21 |
| 20 | 13,400 | — | 5 | 3 |
| 21 | 12,350 | — | 14 | 5.5 |
| 22 | 8,650 | — | 25 | 7 |
| 23 | 9,900 | — | 6 | 3 |
| 24 | 10,200 | — | 15 | 7.5 |
| 25 | 10,300 | — | 2.5 | 1 |
| 26 | 8,900 | — | 6 | 8 |
| 27 | 10,000 | — | 12 | 8 |

The results demonstrate that polyesters and tackifying resins can be used with the high molecular weight polymers of this invention to provide high green strength and long open time at low application viscosity.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A moisture curable polyurethane hot melt adhesive composition comprising:
   (a) an isocyanate and a polyol; and
   (b) a high molecular weight acrylic polymer having a weight average molecular weight in the range of 80,000 to 250,000 g per mole;
   wherein the adhesive has an overall acrylic concentration in the range 1-99 wt % of the composition.

2. The adhesive of claim 1, wherein the high molecular weight polymer has a weight average molecular weight in the range of 80,000 to 180,000 g per mole.

3. The adhesive of claim 1, wherein the high molecular weight polymer has a weight average molecular weight in the range of 100,000 to 180,000 g per mole.

4. The adhesive of claim 1, wherein the adhesive comprises an overall acrylic concentration in the range 5-75 wt %.

5. The adhesive of claim 1, wherein the adhesive comprises an overall acrylic concentration in the range of 10-50 wt %.

6. The adhesive of claim 1, wherein the high molecular weight acrylic polymer is prepared from monomers selected from the group consisting of acrylic acid, methacrylic acid, and $C_1$ to $C_{12}$ esters of methacrylic and acrylic acids.

7. The adhesive of claim 6, wherein the high molecular weight polymer is a copolymer of methyl methacrylate, n-butyl methacrylate and methacrylic acid.

8. The adhesive of claim 1, wherein the high molecular weight acrylic polymer contains tertiary amine functional groups.

9. The adhesive of claim 8, wherein the tertiary amine containing monomers are selected from the group consisting of dimethylamino ethyl methacrylate, diethylamino ethyl methacrylate and the corresponding acrylates.

10. The adhesive of claim 9, wherein the high molecular weight acrylic polymer contains acid groups.

11. The adhesive of claim 1 further comprising a low molecular weight acrylic polymer having a weight average molecular weight of 5,000 to 60,000 g per mole.

12. The adhesive of claim 11, wherein the low molecular weight acrylic polymer has a weight average molecular weight in the range of 10,000 to 30,000 g per mole.

13. The adhesive of claim 11, wherein the low molecular weight acrylic polymer contains a group selected from acid groups obtained via the copolymerisation of acid containing monomers, tertiary amine functional groups obtained via the copolymerisation of tertiary amine containing monomers, and hydroxyl functional groups obtained via the copolymerization of hydroxyl containing monomers.

14. The adhesive of claim 11, wherein the low molecular weight acrylic polymer contains hydroxyl functional groups obtained via the copolymerization of hydroxyl containing monomers.

15. A moisture curable polyurethane hot melt adhesive composition prepared from a mixture comprising:
   an isocyanate;
   a polyol;
   a high molecular weight acrylic polymer having a weight average molecular weight in the range of 80,000 to 250,000 g per mole; and
   a low molecular weight acrylic polymer having a weight average molecular weight of 5,000 to 60,000 g per mole;
   wherein the mixture has an overall acrylic concentration in the range 10-50 wt % of the mixture.

16. The adhesive of claim 14 wherein the high molecular weight acrylic polymer comprises acid and/or tertiary amine functional groups.

* * * * *